United States Patent
Goh

(10) Patent No.: US 8,754,858 B2
(45) Date of Patent: Jun. 17, 2014

(54) METHOD TO PARAMETERIZE AND RECOGNIZE CIRCULAR GESTURES ON TOUCH SENSITIVE SURFACES

(75) Inventor: Hup-Peng Goh, Singapore (SG)

(73) Assignee: STMicroelectronics Aisa Pacific Pte, Singapore (SG)

( * ) Notice: Subject to any disclaimer, the term of this patent is extended or adjusted under 35 U.S.C. 154(b) by 733 days.

(21) Appl. No.: 12/876,905

(22) Filed: Sep. 7, 2010

(65) Prior Publication Data

US 2012/0056821 A1 Mar. 8, 2012

(51) Int. Cl.
*G06F 3/041* (2006.01)
*G09G 5/00* (2006.01)

(52) U.S. Cl.
USPC .......................................... 345/173; 345/212

(58) Field of Classification Search
USPC .......... 345/173, 178, 174, 157, 156, 211, 212
See application file for complete search history.

(56) References Cited

U.S. PATENT DOCUMENTS

| | | | |
|---|---|---|---|
| 2011/0157027 A1* | 6/2011 | Rissa | 345/173 |
| 2012/0176335 A1* | 7/2012 | Stallings | 345/173 |

* cited by examiner

*Primary Examiner* — Michael Faragalla
(74) *Attorney, Agent, or Firm* — Hogan Lovells US LLP

(57) ABSTRACT

A method to parameterize and recognize circular gestures on touch sensitive surfaces includes dividing the touch sensitive surface into four quadrants, detecting a transition from a first quadrant into a second quadrant, time-stamping and tracking each detected quadrant transition, and computing the time between quadrant transitions so that the circular speed and direction of the circular gestures on the touch sensitive surface can be detected. The detected direction can be either a clockwise or a counter-clockwise direction.

16 Claims, 6 Drawing Sheets

Quadrant Definition

Quadrant Processing Flow

Quadrant Processing Flow

Quadrant Definition

METHOD TO PARAMETERIZE AND RECOGNIZE CIRCULAR GESTURES ON TOUCH SENSITIVE SURFACES

BACKGROUND OF THE INVENTION

1. Field of the Invention

The present invention is related to touch-screens, and more particularly, to a novel method of interacting with the touch-screen through the use and recognition of circular gestures.

2. Description of the Related Art

The hardware associated with touch-screens and the corresponding conventional method of operation are well known in the art. However, new modes of operation for interacting with a touch-screen are continually desired. For the ever-increasing demand for touch input devices, such as a touch-screen, there is a need to have a least strain and most intuitive gesture to detect sustained continuous adjustments. Circular gesturing on touch sensitive surface is the best way to indicate prolonged continual adjustments.

What is desired, therefore, is a method to parameterize and recognize circular gestures on touch sensitive surfaces such as a touch-screen.

SUMMARY OF THE INVENTION

The method of the invention, therefore, parameterizes circular gestures made anywhere on a touch sensitive surface. The method of the present invention includes extracting parameters to indicate clockwise or counter-clockwise motion of circular gestures made anywhere on a touch sensitive surface. The method of the present invention also includes extracting parameters to indicate the speed of the clockwise or counter-clockwise motion of circular gestures made anywhere on a touch sensitive surface.

The method to parameterize and recognize circular gestures on touch sensitive surfaces according to the present invention includes dividing the touch sensitive surface into four quadrants, detecting a transition from a first quadrant into a second quadrant, time-stamping and tracking each detected quadrant transition, and computing the time between quadrant transitions so that the circular speed and direction of the circular gestures on the touch sensitive surface can be detected. The detected direction can be either a clockwise or a counter-clockwise direction. Each of the four quadrants of the touch-screen is classified. Each touch point (X, Y) on the touch-screen across time is grouped in a respective quadrant depending on the changes in the current X and Y positions in a current touch frame with respect to a previous frame. A tracking touch point is classified in Quadrant1 (Q1) when a current Y coordinate is less than a previous Y coordinate and a current X coordinate is greater than a previous X coordinate. A tracking touch point is classified in Quadrant2 (Q2) when a current Y coordinate is greater than a previous Y coordinate and a current X coordinate is greater than a previous X coordinate. A tracking touch point is classified in Quadrant3 (Q3) when a current Y coordinate is greater than a previous Y coordinate and a current X coordinate is less than a previous X coordinate. A tracking touch point is classified in Quadrant4 (Q4) when a current Y coordinate is less than a previous Y coordinate and a current X coordinate is less than a previous X coordinate. Each tracked touch point is monitored for quadrant transitions, and a clockwise touch point movement is recognized by a sequence of increasing quadrant numbers. Each tracked touch point is monitored for quadrant transitions, and a counter-clockwise touch point movement is recognized by a sequence of decreasing quadrant numbers. The method of the present invention further provides a quadrant transition value. A quadrant transition value of 00 comprises a no quadrant transition value. A quadrant transition value of 01 comprises a clockwise quadrant transition value. A quadrant transition value of 10 comprises a counter-clockwise quadrant transition value. The method of the present invention further provides a timestamp value when there is a quadrant transition. The timestamp value measures the time lapsed between a current and a previous quadrant transition.

A first method for circular gesture recognition associated with a touch-screen according to the present invention includes providing a timer loaded with a chosen number of ticks to count down to zero, and the timer is reloaded whenever it reaches zero or when there is a change in direction of a quadrant transition, providing a transition counter that increments on every quadrant transition, and the counter is cleared on timer load or reload, and if the number of quadrant transitions in the same direction is equal to or above the criteria threshold when the timer reaches zero, a circular gesture is recognized.

A second method for circular gesture recognition associated with a touch-screen according to the present invention includes providing a transition counter that increments on every quadrant transition, and the counter is cleared when a chosen fixed number of same direction quadrant transitions is reached or when there is a direction change before the chosen number of transitions is reached, and providing a timestamp that is accumulated for every quadrant transition, and the timestamp accumulation is cleared when the transition counter is cleared, and if the accumulated time is less than the threshold time when the transition counter reaches the chosen number of quadrant transitions, a circular gesture is recognized.

BRIEF DESCRIPTION OF THE DRAWINGS

Other objects and advantages of the present invention will become apparent from the following description of the preferred embodiment with reference to the drawings, in which.

DETAILED DESCRIPTION

Figure 1A:
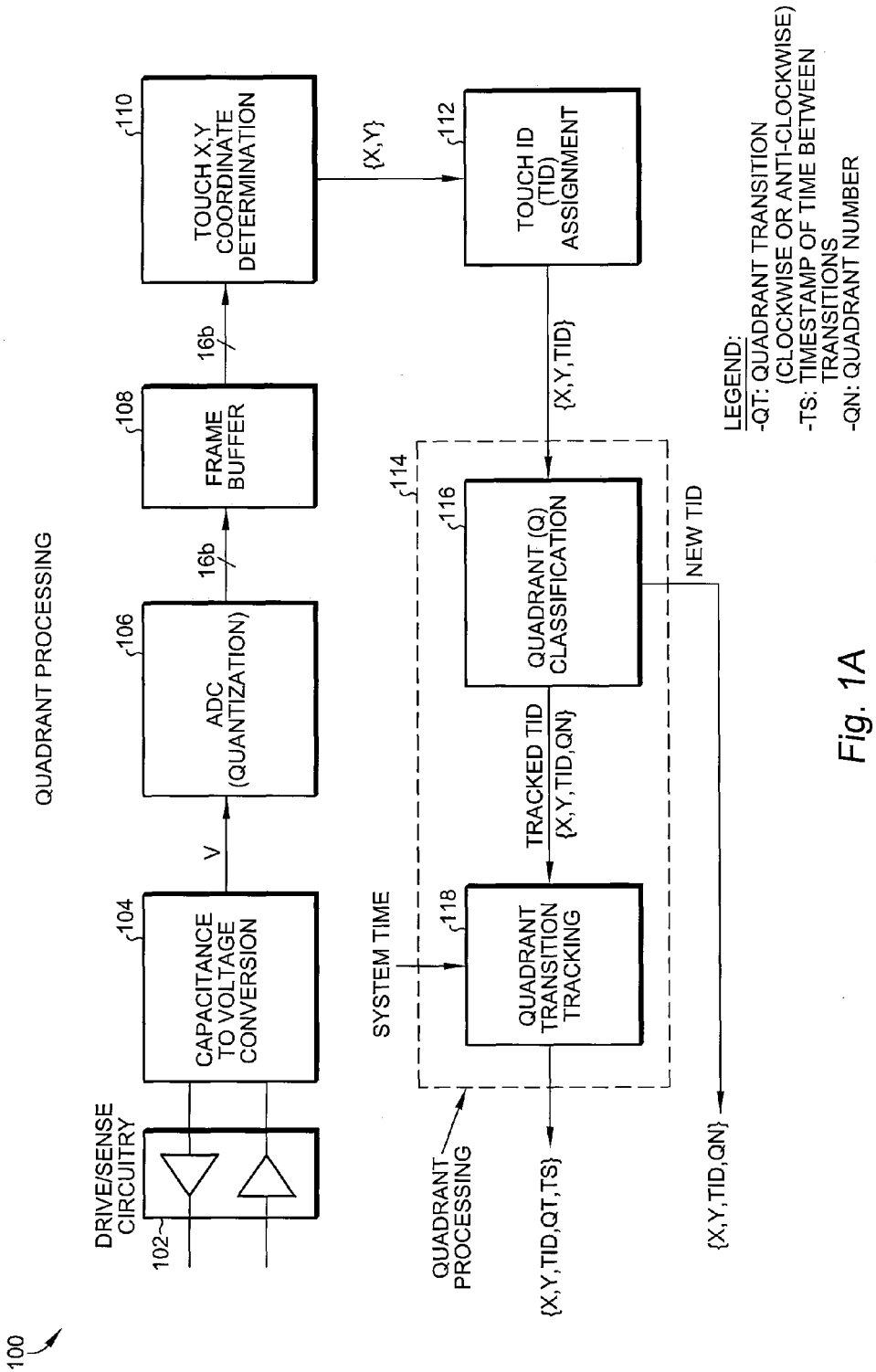
FIG. 1A is a block diagram of the quadrant processing flow for a touch-screen system according to the present invention.

Referring now to FIG. 1A, a touch-screen system 100 is shown in FIG. 1A for driving a touch-screen (not actually shown in FIG. 1A). The touch-screen system 100 includes drive/sense circuitry 102 for communicating with the X-lines and Y-lines in the touch-screen. The drive/sense circuitry 102 is in communication with a capacitance-to-voltage conversion block 104 to produce an output voltage. The output voltage of the capacitance-to-voltage conversion block 104 is sensed by an analog-to-digital (ADC) quantization block 106 to provide a sixteen bit digital output. The output of the ADC block 106 is coupled to a frame buffer 108. The digital output of the frame buffer 108 is coupled to a touch X,Y coordinate determination block 110 to provide an (X, Y) output. The output of the coordinate determination block 110 is coupled to a touch ID (TID) assignment block 112. The TID assignment block has an output that provides X, Y, and TID information for normal touch-screen information processing. The X, Y, and TID information is received by the quadrant processing block 114 including a quadrant classification block 116 and a quadrant transition tracking block 118. The quadrant classification block 116 receives the X, Y, and TID information and provides X, Y, TID, and QN (Quadrant Number) information at a first output. A second output of the quadrant classification block 116 provides new TID information including X, Y, TID, and QN information. The quadrant transition tracking block 118 receives the X, Y, TID, and QN information, as well as system time information to provide the X, Y, TID, QT (Quadrant Transition, clockwise or counter-clockwise) and TS (Time Stamp or time between transitions) information. The outputs of the quadrant processing block 114 is further used for recognition of circular gestures as is described in further detail below.

Figure 1B:
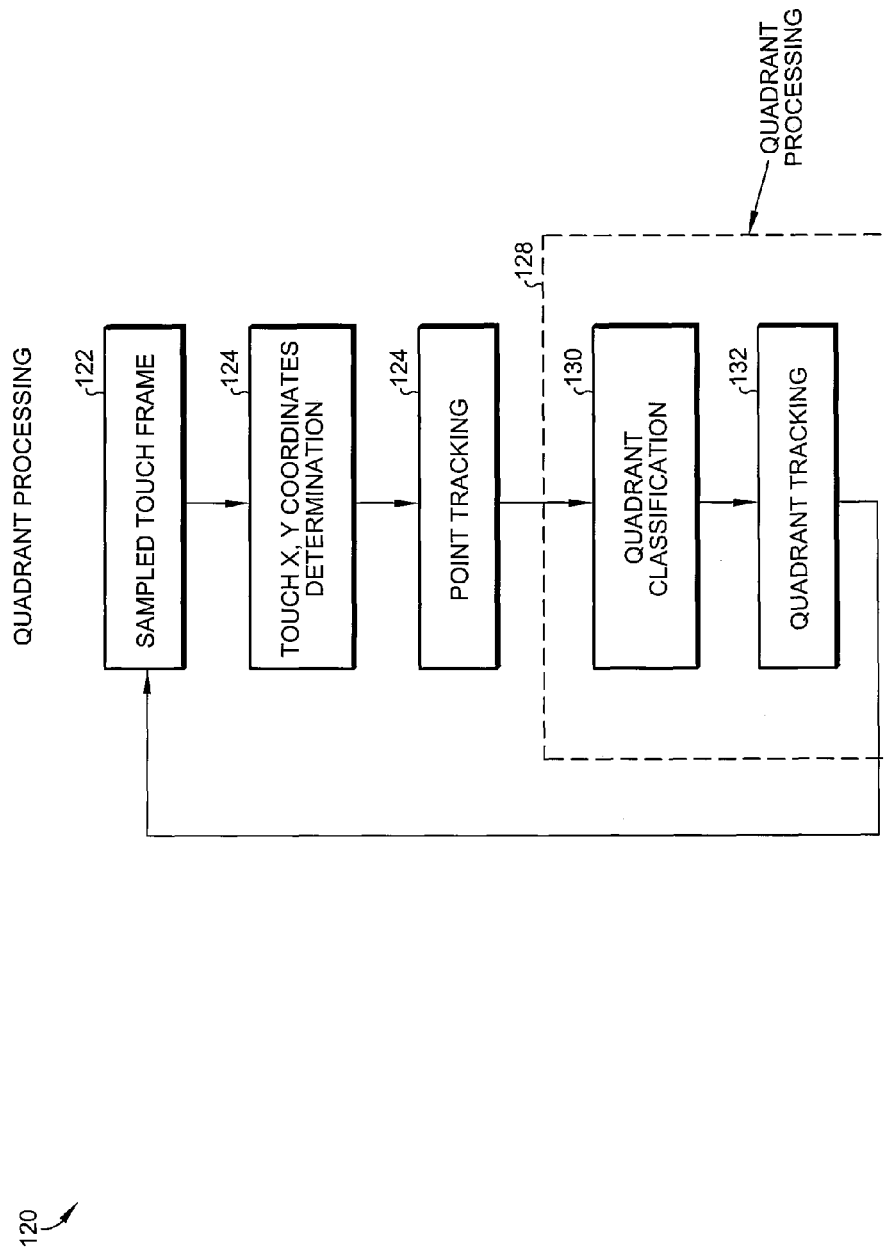
FIG. 1B is a flow chart associated with the block diagram of FIG. 1A.

A flow chart 120 of the quadrant processing method according to the present invention is shown in FIG. 1B. FIG. 1B illustrates the quadrant processing method for a typical touch-screen frame data processing flow according to the present invention. Flow chart 120 starts with a sampled touch frame at step 122. The touch X, Y coordinates of the touch frame are determined at step 124. The point coordinates are then tracked at step 126. The tracked points are then processed at the quadrant processing block 128. The quadrant processing task 128 is divided into two parts: quadrant classification 130 and quadrant tracking 132.

Figure 2:
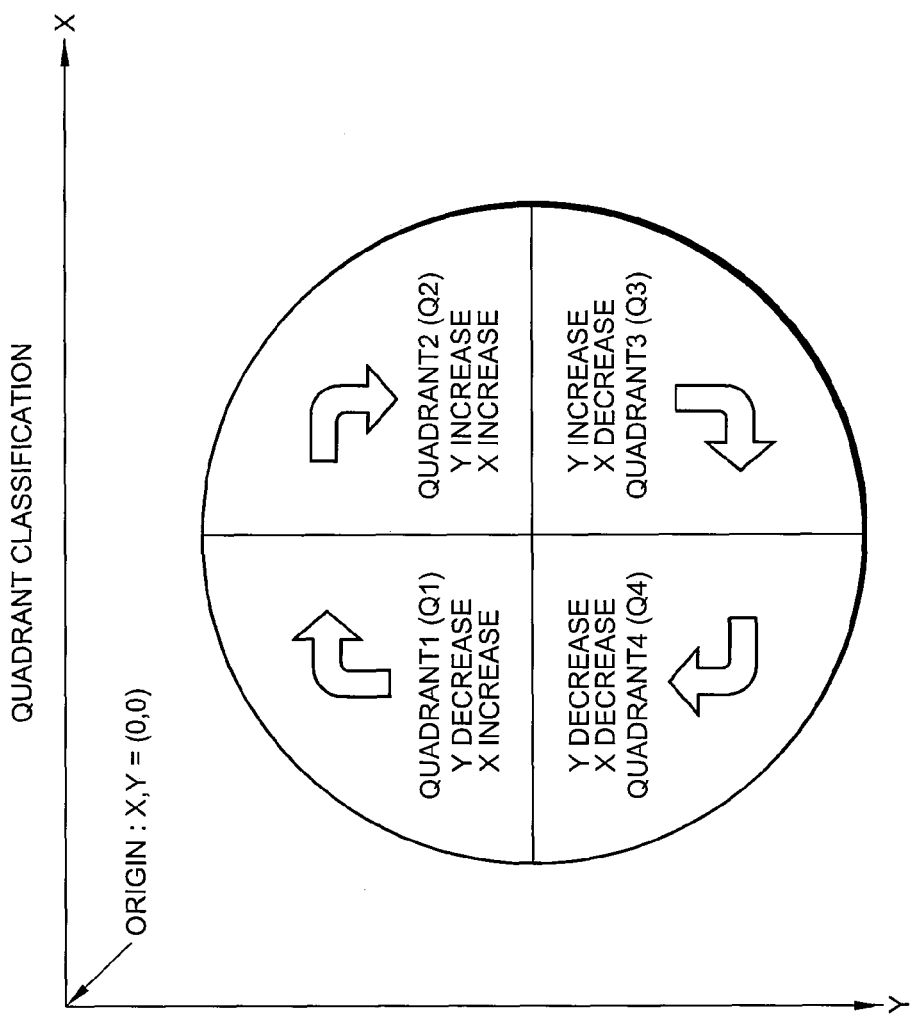
FIG. 2 is a diagram of touch movements on a touch-screen classified into four quadrants according to the present invention.

Quadrant classification is further described with respect to FIG. 2. It should be noted that classification is based on relative touch movement on a TID and not on absolute position of TID on the screen. Point movement history is classified into FOUR quadrants Quadrant1 (Q1), Quadrant2 (Q2), Quadrant3 (Q3), and Quadrant4 (Q4) shown in FIG. 2. In FIG. 2, X and Y are the Cartesian coordinates of a touch surface. Each touch point (X,Y) across time is grouped in the respective quadrant depending on the changes in the current X and Y positions in current touch frame from previous frame. A tracking touch point is classified in Quadrant1 (Q1) when the current Y coordinate is less than the previous Y coordinate and the current X coordinate is greater than the previous X coordinate. A tracking touch point is classified in Quadrant2 (Q2) when the current Y coordinate is greater than the previous Y coordinate and the current X coordinate is greater than the previous X coordinate. A tracking touch point is classified in Quadrant3 (Q3) when the current Y coordinate is greater than the previous Y coordinate and the current X coordinate is less than the previous X coordinate. A tracking touch point is classified in Quadrant4 (Q4) when the current Y coordinate is less than the previous Y coordinate and the current X coordinate is less than the previous X coordinate.

Figure 3:
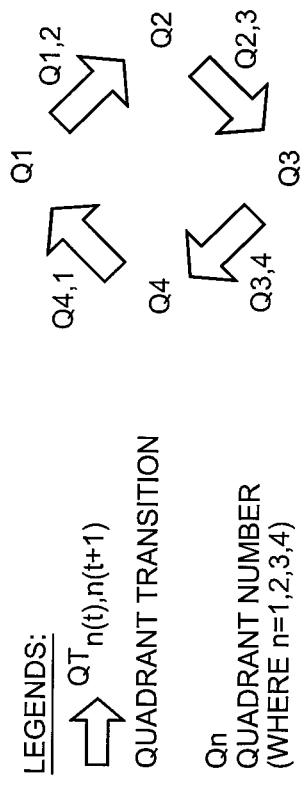
FIG. 3 is a diagram of a touch-screen illustrating the definition of clockwise movement according to the quadrant touch-screen convention used in FIG. 2.

Clockwise quadrant tracking is shown in FIG. 3. After quadrant classification, each tracked touch point can be monitored for quadrant transitions. FIG. 3 explains the clockwise quadrant definition. Clockwise touch point movement can be recognized by a sequence of increasing quadrant numbers with Q4 returning to Q1 as shown in FIG. 3. A tracked touch point can start from any quadrant number.

Figure 4:
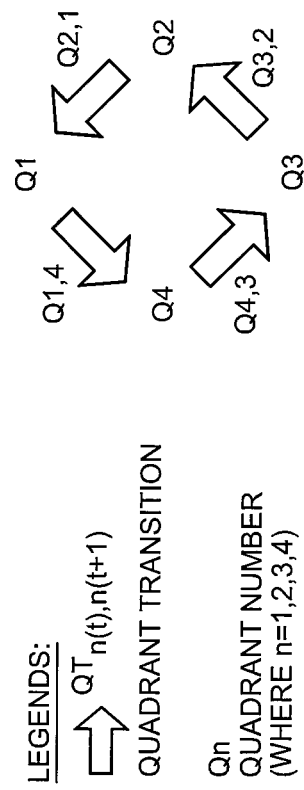
FIG. 4 is a diagram of a touch-screen illustrating the definition of counter-clockwise movement according to the quadrant touch-screen convention used in FIG. 2.

Counter-Clockwise quadrant tracking is shown in FIG. 4. After quadrant classification, each tracked point can be monitored for quadrant transitions. FIG. 4 explains the counter-clockwise quadrant definition. Counter-clockwise touch point movement can be recognized by a sequence of decreasing quadrant numbers with Q1 returning to Q4 as shown in FIG. 4. A tracked touch point can start from any quadrant number.

According to the method of the present invention, it is important that quadrant transition speed be measured. Each quadrant transition can be time-stamped and tracked. The time between quadrant transitions can be computed to indicate circular speed of gestures. The two additions to the information of a tracked TID (QT,TS), referred to in FIG. 1A, are used to recognize circular gestures and the corresponding speed thereof as follows:

Quadrant Transition (QT) has three values:
For an example of QT encoding:
  '00'—no quadrant transition
  '01'—clockwise quadrant transition
  '10'—anticlockwise quadrant transition A timestamp (TS) is provided when there is a quadrant transition. TS measures the time lapsed between a current and a previous quadrant transition. This time information is useful to compensate for latency in processing the QT data. Some systems may choose to ignore TS for simplicity or if latency is not an issue.

A first method for gesture and speed recognition according to the present invention uses a transition threshold criteria. A minimum number of quadrant transitions in the same direction in a chosen period of time is used in this method. A timer is loaded with a chosen number of ticks to count down to zero. This timer is reloaded whenever it reaches zero or when there is a change in direction of quadrant transition. A transition counter increments on every quadrant transition. This counter is cleared on timer load or reload. If the number of quadrant transitions in the same direction is equal to or above the criteria threshold when the timer reaches zero, circular gesture is recognized. The higher the number of same direction quadrant transitions is above the criteria threshold, the faster is its circular speed. Timestamp (TS) information is not used in this method.

Figure 5:
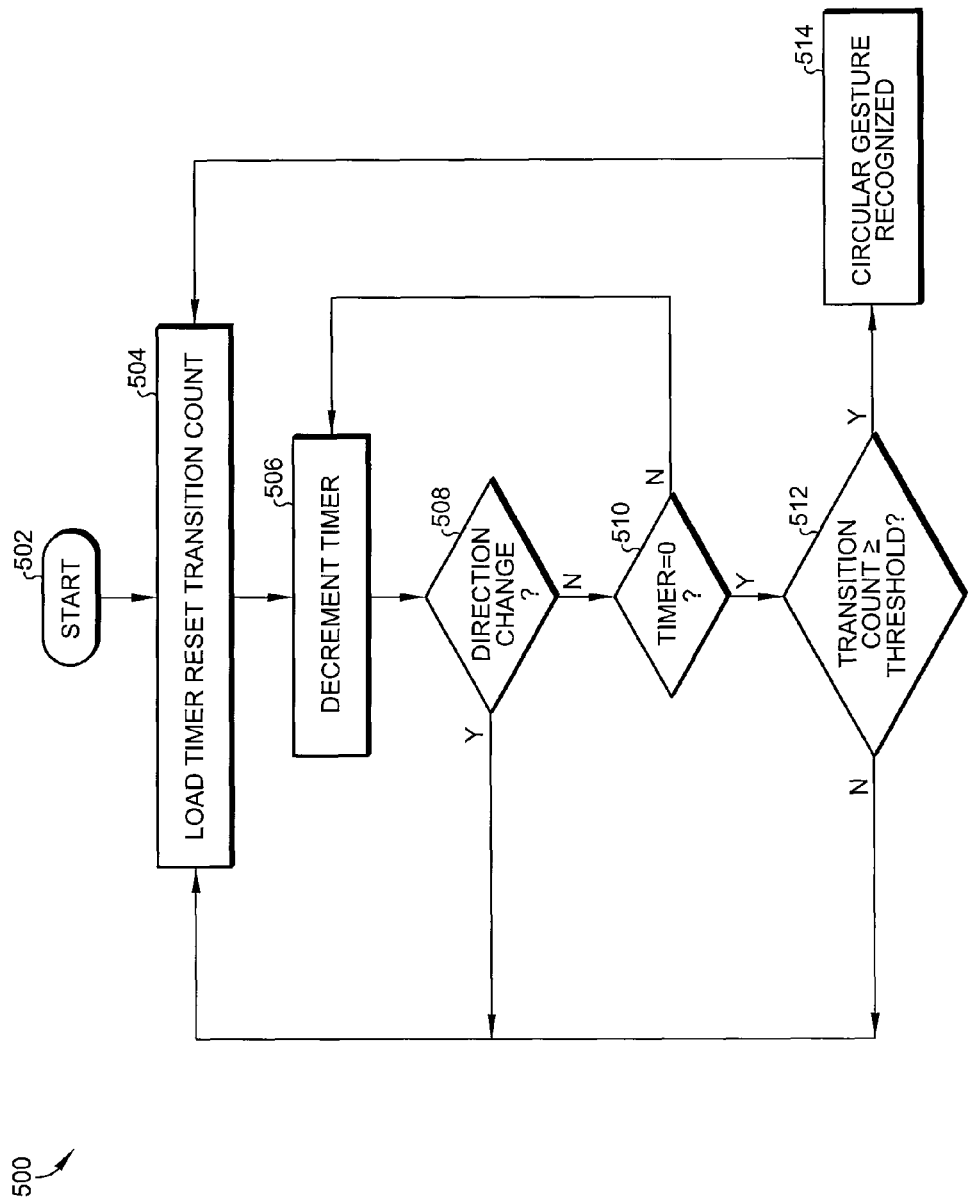
FIG. 5 is a flow diagram illustrating a first method of circular gesture and speed recognition according to the present invention.

The first method is shown in the flow diagram 500 of FIG. 5. The method starts at a first step 502. A timer is loaded and the transition count is reset at step 504. At step 506 the timer is decremented. At decision block 508 the method detects whether a directional change has been made. If yes, the timer is again loaded and the transition count is reset at step 504. In no, the method continues to decision block 510. At decision block 510 the method detects whether the timer value is equal to zero. If no, the timer is again decremented at step 506. If yes, the method continues to decision block 512. At decision block 512, the method detects whether or not the transition count is greater or equal to a predetermined threshold. If no, the timer is again loaded and the transition count is reset at step 504. If yes, then a circular gesture is recognized at step 514, and the timer is again loaded and the transition count reset at step 504.

A second method for gesture and speed recognition according to the present invention uses a time threshold criteria. A maximum time taken for a chosen number of quadrant transitions in the same direction is used in this method. A transition counter increments on every transition. This counter is cleared when the chosen fixed number of same direction transitions is reached or when there is a direction change before the chosen number of transitions is reached. The timestamp is accumulated for every quadrant transition.

The timestamp accumulation is cleared when the transition counter is cleared. If the accumulated time is less than the threshold time when the transition counter reaches the chosen number of quadrant transitions, a circular gesture is recognized. The lower the accumulated time is below the threshold time, the faster is its circular speed.

Figure 6:
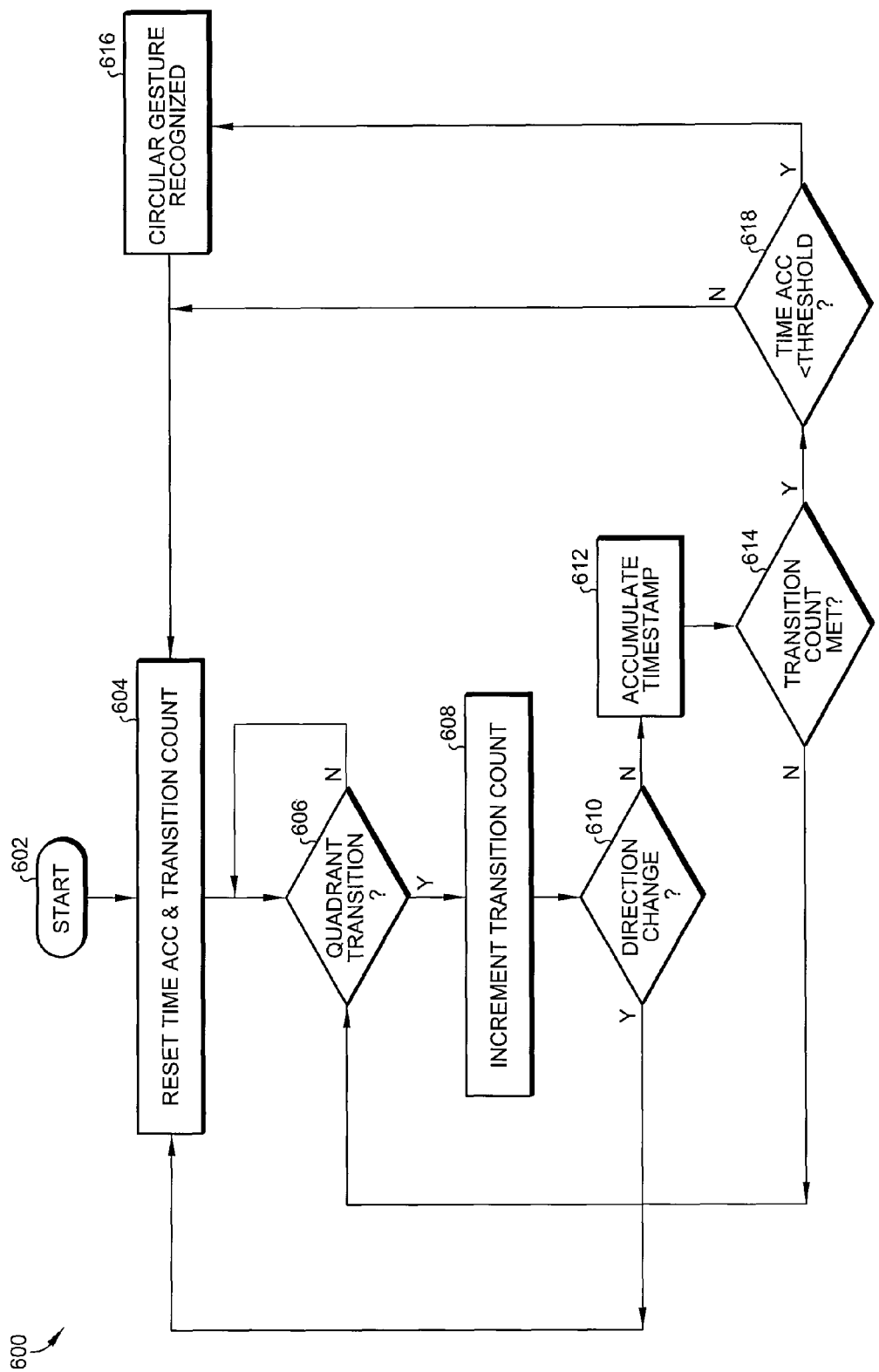
FIG. 6 is a flow diagram illustrating a second method of circular gesture and speed recognition according to the present invention.

The second method is shown in the flow diagram 600 of FIG. 6. The method starts at a first step 602. A timestamp accumulator and the transition count is reset at step 604. At decision block 606 the method detects whether a quadrant transition has been made. If no, the method continues to periodically check whether or not a quadrant transition has been. In yes, the method increments the transition count at step 608. At decision block 610 detects whether or not a directional change has been made. If yes, the time accumulator and the transition count is reset at step 604. If no, the timestamp is accumulated at step 612. At decision block 614, the method detects whether or not the transition count has been met. If no, the method detects whether or not a quadrant transition has been made at decision block 606. If yes, then the method checks whether or not the time accumulator value is less than a predetermined threshold at decision block 618. If no, then the time accumulator and transition count is again reset at step 604. If yes, then a circular gesture is recognized at step 616, and the time accumulator and transition count is reset at step 604.

Since the quadrant classification and quadrant transition tracking are based on a single tracked touch ID (TID), the method of the present invention can be expanded to recognize circular gestures of other TIDS present on the same touchscreen While various embodiments of the present invention have been described above, it should be understood that they have been presented by way of example only, and not as a limitation. Thus, the breadth and scope of the present invention should not be limited by any of the above-described exemplary embodiments, but should be defined only in accordance with the following claims and their equivalents.

I claim:

1. A method to parameterize and recognize circular gestures on touch sensitive surfaces comprising:
    dividing the touch sensitive surface into four quadrants;
    detecting a transition from a first quadrant into a second quadrant;
    time-stamping and tracking each detected quadrant transition;
    computing the time between quadrant transitions so that the circular speed and direction of the circular gestures on the touch sensitive surface can be detected; and
    classification of the four quadrants;
    wherein each touch point (X, Y) across time is grouped in a respective quadrant depending on the changes in the current X and Y positions in a current touch frame with respect to a previous frame,
    wherein a tracking touch point is classified in Quadrant1 (Q1) when a current Y coordinate is less than a previous Y coordinate and a current X coordinate is greater than a previous X coordinate,
    wherein a tracking touch point is classified in Quadrant2 (Q2) when a current Y coordinate is greater than a previous Y coordinate and a current X coordinate is greater than a previous X coordinate,
    wherein a tracking touch point is classified in Quadrant3 (Q3) when a current Y coordinate is greater than a previous Y coordinate and a current X coordinate is less than a previous X coordinate, and
    wherein a tracking touch point is classified in Quadrant4 (Q4) when a current Y coordinate is less than a previous Y coordinate and a current X coordinate is less than a previous X coordinate.

2. The method of claim 1 wherein the direction comprises a clockwise direction.

3. The method of claim 1 wherein the direction comprises a counter-clockwise direction.

4. The method of claim 1 wherein each tracked touch point is monitored for quadrant transitions, and a clockwise touch point movement is recognized by a sequence of increasing quadrant numbers.

5. The method of claim 1 wherein each tracked touch point is monitored for quadrant transitions, and a counter-clockwise touch point movement is recognized by a sequence of decreasing quadrant numbers.

6. The method of claim 1 further comprising providing a quadrant transition value.

7. The method of claim 6 wherein a quadrant transition value of 00 comprises a no quadrant transition value.

8. The method of claim 6 wherein a quadrant transition value of 01 comprises a clockwise quadrant transition value.

9. The method of claim 6 wherein a quadrant transition value of 10 comprises a counter-clockwise quadrant transition value.

10. The method of claim 1 further comprising providing a timestamp value.

11. The method of claim 10 wherein the timestamp value is provided when there is a quadrant transition.

12. The method of claim 10 wherein the timestamp value measures the time lapsed between a current and a previous quadrant transition.

13. A method to parameterize and recognize circular gestures on touch sensitive surfaces comprising:
    dividing the touch sensitive surface into four quadrants;
    detecting a transition from a first quadrant into a second quadrant;
    time-stamping and tracking each detected quadrant transition;
    computing the time between quadrant transitions so that the circular speed and direction of the circular gestures on the touch sensitive surface can be detected; and
    providing at least three distinct quadrant transition values.

14. The method of claim 13 wherein a quadrant transition value of 00 comprises a no quadrant transition value.

15. The method of claim 13 wherein a quadrant transition value of 01 comprises a clockwise quadrant transition value.

16. The method of claim 13 wherein a quadrant transition value of 10 comprises a counter-clockwise quadrant transition value.

* * * * *

UNITED STATES PATENT AND TRADEMARK OFFICE
CERTIFICATE OF CORRECTION

PATENT NO. : 8,754,858 B2
APPLICATION NO. : 12/876905
DATED : June 17, 2014
INVENTOR(S) : Hup-Peng Goh It is certified that error appears in the above-identified patent and that said Letters Patent is hereby corrected as shown below:

Title Page, item (73) Assignee: "STMicroelectronics Aisa Pacific Pte"
should be --STMicroelectronics Asia Pacific Pte Ltd.--

Signed and Sealed this
Seventeenth Day of February, 2015

Michelle K. Lee
*Deputy Director of the United States Patent and Trademark Office*